United States Patent [19]

Bahl et al.

[11] 4,375,984

[45] Mar. 8, 1983

[54] RECOVERY OF GOLD FROM BROMIDE ETCHANTS

[76] Inventors: Surinder K. Bahl, 670 Talowood Dr., Dayton, Ohio 45430; Gale L. Leach, 1315 Carpenter Dr., Bellbrook, Ohio 45305

[21] Appl. No.: 178,245

[22] Filed: Aug. 14, 1980

[51] Int. Cl.³ .......................... C22B 11/04; B44C 1/22
[52] U.S. Cl. ................................. 75/97 A; 75/118 R; 75/97 A; 75/102; 75/108; 156/625; 156/664; 252/79.1; 134/13
[58] Field of Search ............. 75/108, 118 R; 156/656, 156/664, 642; 252/79.1, 79.2; 134/13

[56] References Cited

U.S. PATENT DOCUMENTS

| | | |
|---|---|---|
| 2,283,198 | 5/1942 | Fink . |
| 2,304,823 | 12/1942 | Harrison . |
| 3,495,976 | 2/1970 | Bazilevsky et al. . |
| 3,625,674 | 12/1971 | Jacobs . |
| 3,709,681 | 1/1973 | Wilson . |
| 3,957,505 | 5/1976 | Homick et al. . |
| 4,190,489 | 2/1980 | Bahl et al. . |
| 4,260,451 | 4/1981 | Schmeckenbecher ................ 423/38 |
| 4,319,922 | 3/1982 | MacDonald ........................... 75/108 |
| 4,319,923 | 3/1982 | Falanga ................................. 75/108 |

OTHER PUBLICATIONS

Wise, Editor, *Gold*, D. Van Nostrand Co., Inc., Princeton, N.J., (1964), pp. 44–50, 323–325.
Flitsch, R., "Etch for Removing Gold", *IBM Technical Disclosure Bulletin*, vol. 10, No. 4, Sep. 1967, p. 355.
Interrante, M., "Reworking Multilayer Ceramic Metal Layers", *IBM Technical Disclosure Bulletin*, vol. 18, No. 2, Jul. 1975, p. 413.

*Primary Examiner*—Brian E. Hearn
*Attorney, Agent, or Firm*—Biebel, French & Nauman

[57] ABSTRACT

Gold, as well as other metals such as copper, titanium, and nickel, are etched from substrates by alkali metal iodide and bromide solutions also containing iodine and bromine, respectively. The dissolved gold is recovered as metallic gold either by precipitating it using an alkali metal hydroxide or by a decomposition technique in which the etchant solution is driven off. A method is also taught to regenerate alkali metal iodide-iodine etchant solution.

2 Claims, No Drawings

RECOVERY OF GOLD FROM BROMIDE ETCHANTS

BACKGROUND OF THE INVENTION

The present invention relates to a process for the recovery of gold and more particularly to a process for recovering gold from gold-plated materials by dissolving the gold in an etchant solution and then precipitating the gold therefrom.

Gold films are widely used in the electronics industry in integrated and thin film circuitry because of their excellent electrically conductive properties. Because of gold's monetary value, it is desirable to recover the excess gold removed from electronic circuitry during etching operations as well as to recover the gold from scrap parts including gold plated printed circuit boards and other decorative or functional gold coated metal, plastic, glass, and ceramic parts.

In the past, commercial processes for dissolving gold have utilized either hot aqua regia (a mixture of concentrated hydrochloric and nitric acids) or cyanide solutions. However, both of these materials are extremely dangerous to handle. Aqua regia is highly corrosive and emits toxic fumes while cyanide solutions can emit deadly cyanide gases if proper handling techniques are not followed. Moreover, there are problems of safely disposing of these materials.

In the search for less toxic materials which will still dissolve gold, others have turned to the use of halogen or halide salt solutions. For example, Harrison, U.S. Pat. No. 2,304,823, teaches a process for recovering precious metals including gold and silver from ore by adding a solution containing iodine, potassium iodide, and nitric acid to the ore to dissolve the precious metals. Mercury is then added which forms an amalgam with the metals which is then precipitated from solution and recovered. Fink, U.S. Pat. No. 2,283,198, teaches several processes for recovering gold from ore including the use of chlorine in combination with sodium bromide and a large excess of sodium chloride or bromine to dissolve the gold. It is taught that the gold in solution can be precipitated and recovered by the addition of zinc dust or ferrous sulfate.

Jacobs, U.S. Pat. No. 3,625,674, teaches a gold recovery process in which gold ore is finely ground and then dissolved in an aqueous solution of ethanol and iodine. Gold is recovered by heating the solution to a temperature which evaporates the alcoholic solution and drives of the iodine as vapor. Bazilevsky et al, U.S. Pat. No. 3,495,976, teach a process for recovering gold from a plated substrate by dissolving the gold in an aqueous solution of potassium iodide and iodine. Sulfuric acid is then added to the solution which is heated to a temperature sufficient to drive off iodine as vapor but not evaporate the solution. Gold precipitates from the solution and is recovered as iodine is driven off.

Homick et al, U.S. Pat. No. 3,957,505, teach a gold recovery process which includes dissolving the gold in an aqueous solution of iodine and alkali metal iodide and then precipitating gold from solution by the addition of either an acid or base in combination with a reducing agent. It is further taught that the iodine-iodide solution can be regenerated by the addition of an oxidizing agent. Lastly, Wilson, U.S. Pat. No. 3,709,681, teaches a process for recovering noble metals including the steps of finely dividing ore containing the metals, dissolving the metals in an aqueous solution of a ketone, an elemental halogen, and a halide salt, and recovering the metals by the addition of heat and zinc, copper, iron, or aluminum metal to precipitate the noble metals.

However, all of the above processes require the presence of reagents in addition to the halogen or halide salts or fail to provide complete recovery of gold. Accordingly, the need still exists in the art for a simple and effective method for quantitative recovery of gold from various substrates.

SUMMARY OF THE INVENTION

In accordance with the present invention, gold and other metals such as copper, titanium, and nickel are dissolved by contacting them with an etchant composition comprising either an aqueous solution of iodine and an alkali metal iodide salt or an aqueous solution of bromine and an alkali metal bromide salt. Gold films coated or plated on various substrate materials are rapidly etched by either of the above compositions at room temperature (i.e., 20°–25° C.).

Gold is recovered from the aqueous solutions by heating the solutions to dryness and then further heating the residue to evolve either iodine or bromine vapors. Essentially complete recovery of gold is obtained. If other metals such as copper, titanium, or nickel are present and etched by the etchant solution, gold is separated from these metals by adding a mineral acid such as hydrochloric, nitric, sulfuric, or hydrofluoric acid to the residue to dissolve the other metals. A gold precipitate will remain and can be recovered.

Alternatively, dissolved gold is recovered from an aqueous iodine-iodide etchant composition by adding a sufficient amount of a base such as sodium or potassium hydroxide to raise the pH of the solution to 13. Gold metal precipitates from solution and is recovered by settling or filtration and then drying. The waste solution, after removal of gold precipitate, is regenerated by the addition of acid to the solution. Dissolved gold is recovered from an aqueous bromine-bromide etchant composition by adding an alcohol and a base in an amount sufficient to raise the pH of the solution to 13. Gold metal is recovered by settling or filtration and then drying.

Accordingly, it is an object of the present invention to provide a simple yet efficient process for the quantitative recovery of gold from gold-plated or gold-coated substrates.

DESCRIPTION OF THE PREFERRED EMBODIMENTS

Etchant solutions used in the practice of the present invention may be prepared by mixing from 10 to 100 grams of an alkali metal bromide or iodide with from 10 to 75 grams of bromine or iodine, respectively, in 200 ml of water. The bromide-bromine etchant solution can be prepared as taught by our U.S. Pat. No. 4,190,489. It has been found that these concentrations and ratios provides rapid etching of gold, as well as other metals such as copper, titanium, and nickel, at room temperature. Although alkali metal halide to elemental halogen mole ratios of from 1:1 to 6:1 are preferred, these ratios are not critical and may vary over a wide range. Changes in the concentrations and relative ratios of components will affect the rate of etching with stronger solutions generally etching metals at a more rapid rate. Heating the etchant solution will also result in a more rapid etching rate.

After the gold has been dissolved into the etchant solution, it is recovered using either a precipitation or a decomposition procedure. The precipitation procedure involves the addition of sodium hydroxide or potassium hydroxide to the etchant solution to adjust the pH of the solution to about 13 or above to cause the precipitation of metallic gold. It has been found that not all bases will cause a metallic gold precipitate. For example, the addition of ammonium hydroxide to the etchant solution results in a black precipitate believed to be an oxide of gold. If the bromide-bromine etching solution is utilized, it has been found that the recovery of gold is enhanced by the addition of a small amount of a water soluble alcohol such as methanol prior to the addition of base.

If other metals have been etched and are in solution with gold, after precipitation by the addition of an alkali metal hydroxide the other metals may be separated from the gold by suspending the precipitate in an aqueous solution and adding a strong mineral acid such as hydrochloric, sulfuric, nitric, or hydrofluoric acid. The mineral acid will dissolve the other metals into solution but will not affect the gold precipitate which can be recovered separately. Typically, the gold precipitate may be recovered by settling and decanting or by filtering the solution through filter paper, although other known recovery procedures may be utilized.

A significant advantage obtained by using the precipitation procedure with iodide-iodine etchant solution is that the etchant solution may be regenerated after the gold has been recovered. This is achieved by adding to the solution a sufficient amount of a strong mineral acid to adjust the pH to neutral or only slightly basic, i.e., a pH of about 7 to 9. As the pH is adjusted, the color of the solution changes from clear to a dark color similar to the original fresh etchant. The regenerated etchant can then be used to etch further gold coated materials.

Gold may also be recovered from the etchant solution by the use of decomposition technique. Etchant solution containing dissolved gold is slowly heated to above about 175° C. causing the evolution of purple(iodine) or red(bromine) gas. Heating is continued until the residue is dry. The residue is then mixed with water. Gold precipitate is then collected by settling and decantation or by filtering the aqueous solution.

The invention may be better understood by reference to the following nonlimiting examples.

EXAMPLE I

An etchant solution containing 50 gm of potassium iodide and 12.5 gm of iodine is mixed with 200 ml water. A gold plated substrate is dipped in the solution and is rapidly etched at room temperature. To twenty-five milliliters of the etchant solution containing dissolved gold, 10 ml of sodium hydroxide solution (prepared by dissolving 30 gm NaOH in 60 ml water) is added. A gold precipitate is obtained which is insoluble in hydrochloric acid or concentrated nitric acid but is soluble in aqua regia indicating that a metallic gold precipitate is obtained.

EXAMPLE II

To an etchant solution containing 2 gm of potassium-bromide and 1 gm of bromine in 25 ml of water, 0.5 gm of gold powder is dissolved. To this solution, 10 ml of methanol is added followed by the addition of 10 ml of a potassium hydroxide solution (prepared by dissolving 20 gm KOH in 40 ml of water). A precipitate is formed and collected. Approximately 0.4 gm of gold is obtained yielding an 80% recovery rate.

EXAMPLE III

To show that the iodide etchant solution can be regenerated and used repeatedly, a solution was made up by adding 250 gm potassium iodide and 62.5 gm iodine to 1000 ml of distilled water. The pH value of the solution was 9. One gram of gold was dissolved in 300 ml of the iodide-iodine solution in a beaker. To this solution, 20 ml of a sodium hydroxide solution (prepared by dissolving 50 gm NaOH in 100 ml of distilled water) was added raising the pH of the solution to 13. Gold precipitate formed and settled to the bottom of the beaker. Forty milliliters of hydrochloric acid was added to the etchant solution to adjust its pH to 9. The solution color changed from clear to a dark color, and the gold precipitate was dissolved. The addition of sodium hydroxide solution until a pH of 13 was reached again caused the gold to precipitate. The cycle was repeated five more times, and in each instance the gold was dissolved by the etchant solution at a pH of 9 and was precipitated from the etchant solution when the pH was adjusted to 13. No change in the rate of dissolution of gold was observed.

EXAMPLE IV

To 25 ml of the iodide-iodine etchant solution of Example I, 0.5 gm of gold was added and dissolved. The solution was heated to dryness and then further heated to above about 175° C. At that point, the residue turned light brown with the evolution of purple(iodine) vapors. The remaining residue was mixed with water, the gold precipitate was allowed to settle to the bottom of the container and was collected. The recovered gold weighed 0.5 gm indicating a 100% recovery.

EXAMPLE V

To 25 ml of the bromide-bromine solution of Example II, 0.5 gm of gold was added and dissolved. The solution was heated to dryness and then further heated until a red(bromine) gas evolved. Upon mixing the residue with water, gold precipitate settled to the bottom of the container and was collected. The recovered gold weighed 0.5 gm indicating a 100% recovery.

While the methods herein described constitute preferred embodiments of the invenion, it is to be understood that the invention is not limited to these precise method, and that changes may be made without departing from the scope of the invention, which is defined in the appended claims.

What is claimed is:

1. A method of recovering gold from gold coated materials comprising the steps of contacting a gold coated material with an aqueous etchant solution comprising an alkali metal bromide and bromine for a time sufficient to etch away the gold layer, adding a water soluble alcohol to the solution, adjusting the pH of the solution to 13 or above to cause precipitation of metallic gold from the solution, and recovering the precipitated gold.

2. The method of claim 1 including the steps of recovering the precipitate, adding a strong mineral acid to dissolve metals other than gold in said precipitate, and recovering the remaining gold.

* * * * *